April 17, 1962     E. E. LINDSEY     3,029,615
MEANS FOR TREATING LIQUIDS
Filed Oct. 9, 1959
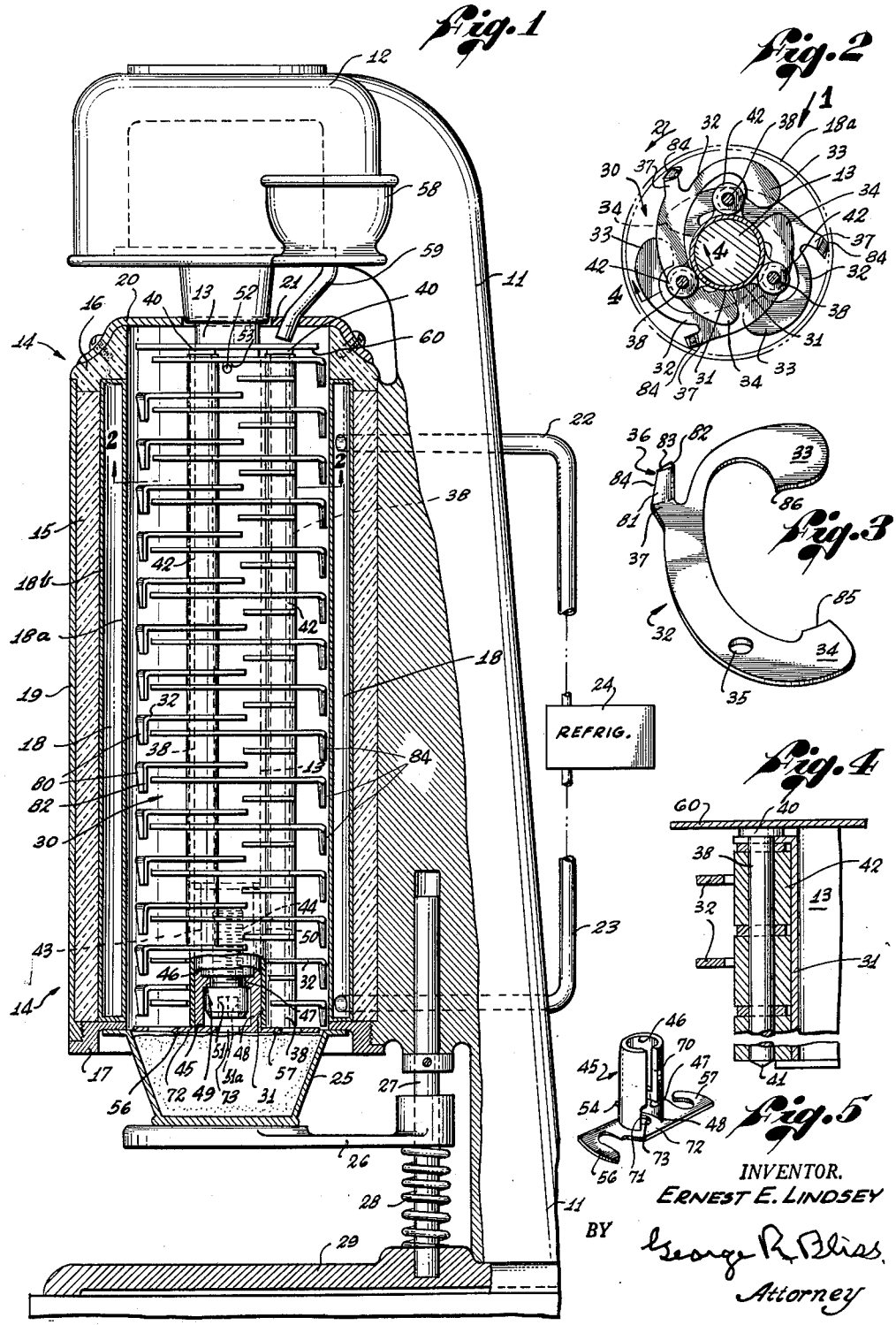
INVENTOR.
ERNEST E. LINDSEY
BY George R. Bliss,
Attorney

United States Patent Office 3,029,615
Patented Apr. 17, 1962

3,029,615
MEANS FOR TREATING LIQUIDS
Ernest E. Lindsey, 4114 Leimert Blvd.,
Los Angeles, Calif.
Filed Oct. 9, 1959, Ser. No. 845,495
13 Claims. (Cl. 62—343)

My invention relates to a means of treating liquids and more particularly, to a means of freezing and chilling confection mixtures at high speed and with a minimum grain size.

Among the objects of my invention are: To provide an improved means of freezing liquids such as a confection mixture at high speed; to provide a means of making frozen confections at high speed and of superior quality; to provide a means of quick freezing a confection in individual units; and to provide an improved means of applying and removing a liquid material such as a confection mixture, to and from a refrigerated surface.

My invention possesses numerous other objects and features of advantage, some of which, together with the foregoing, will be set forth in the following description of specific apparatus.

FIGURE 1 is a longitudinal view, partly in vertical section and partly in elevation of an apparatus embodying the invention taken in the direction of the arrow 1 in FIGURE 2.

FIGURE 2 is a horizontal sectional view taken looking upwardly as indicated by the line 2—2 in FIGURE 1.

FIGURE 3 is a perspective view of one of the fingers.

FIGURE 4 is a fragmentary vertical sectional view taken along the line 4—4 of FIGURE 2, some of the parts being shown in elevation.

FIGURE 5 is a perspective view of the extruder.

Referring to the drawing, a frame 11 carries at its upper end a motor 12 having a central shaft 13 extending downwardly from the motor. Also carried on the frame is a hollow cylinder 14 comprising a cylindrical shell 15 and an upper ring 16 and a lower ring 17.

An inner portion of the shell 15 which extends from the upper to the lower end thereof and is secured in any suitable manner to the outer portion of shell 15 is a double walled elongated hollow cylinder 18 of metal or other material of high thermal conductivity. This cylinder 18 constitutes a liquid tight jacket with its inner wall 18a preferably flush with the inner surfaces of the rings 16 and 17 and its outer wall 18b fitted within and contacting the inner surface of the remainder of the shell 15. The outer portion of the shell 15 and the upper ring 16 are preferably made of a heat insulating material. The outer surface of the shell 15 is protected on its leftward side as seen in FIGURE 1 by a housing 19 of suitable material and on its rightward side by the adjacent portion of the frame 11. The upper end of the cylinder 14 is closed by a preferably plastic cover 20 secured to the upper ring 16 and provided with a central opening 21 for the shaft 13.

A refrigerating fluid may be circulated through the chamber 18 by pipes 22 and 23 from a refrigerating system 24. Precooled brine may be circulated, or a volatile liquid may be allowed to expand in chamber 18, thus cooling the cylinder 14 by extraction of heat during the expansion of the liquid, in the customary manner of a refrigerating unit.

At the bottom of the cylinder 14 is disposed a confection receptable 25 mounted on a swinging bar 26, the latter being pivoted on an upright pin 27 so that the receptable 25 may be placed on the bar 26 to close the bottom of the cylinder 14, the arm being forced upwardly by spring 28. Frame 11 is supported in a vertical position preferably by a removable base 29. It will be understood that the frozen or chilled product may be withdrawn through an apertured and valved plate at the lower end of the cylinder in lieu of the receptable 25 if desired.

A liquid beating and whipping assembly 30 consists of a hollow supporting tube 31 mounted concentrically within the cylinder 14 and slidably on the shaft 13, and a plurality, preferably three, rows of vertically alined fingers 32 which are supported on the tube 31; each row is pivotally mounted centrally on a respective one of three vertical axes at equidistant horizontal levels. The three axes are arranged in staggered fashion at equal angles of 120 degrees about the axis of the tube 31 which is also the axis of the machine as a whole. The supporting structure on the tube 31 which provides for this mounting arrangement of the fingers will be presently described.

Each finger 32 is a horizontally extended flat plate of generally arcuate profile having enlarged ends 33 and 34, a circular pivot pin opening 35, near the end 34, and a blade 36 projecting downwardly and rotatively rearwardly from a short tangentially directed arm 37 disposed near the finger end 33.

Each one of three vertically disposed pivot pins 38 serves as a pivot for all the fingers of an associated row of the three vertical rows of fingers. Each pivot pin has a head 40 at its upper end and is pointed at 41 at its lower end. Each pivot pin 38 is snugly embraced by, and vertically slidable within, an associated one of three relatively thick walled tubes 42 of smaller diameter than that of the tube 39. Each of these tubes 42 is integrally welded to the side wall of the larger tube 31. Each of these tubes is not continuous but consists of a series of axially alined tube sections 42a, each section being welded to the side wall of the large continuous tube 31. The axes of the tubes 42 are spaced at angles of 120 degrees from each other around the tube 31.

The head 40 of each pin rests upon the upper end surface of its associated tube 42. The pin is of such a length that the tip 41 of its lower projects slightly below the lower end surface of the tube 42. The upper end surfaces of the central tube 31 and the three smaller outer tubes 42 are in the same horizontal plane; the same relationship is true of the lower end surfaces of the tube 31 and of the tubes 42. The beater assembly tube 31 is held vertically in position on the motor shaft 13 as follows.

A short lower end portion 43 of the motor shaft 13 is of a reduced diameter and is formed with an axial threaded bore 44 extending a short distance into the body of the shaft. A hollow cylindrical retainer plug 45 of an outside diameter to fit the bore of the supporting tube 31 is formed with bore portions of two diameters. A bore portion 46 of one diameter extends downwardly from the upper end surface of the plug to an inwardly projecting annular flange 47. A bore portion 48 of the same or slightly smaller diameter, extends downwardly from the flange 47 to the lower end surface of the plug 45. A bolt 49 with a threaded shank 50 is inserted upwardly and screwed into the bore 44 in the lower end of the shaft 13. Wings 56, 57 radially extending from a lower end plate 72 of the plug 45, engage the bottom surfaces of the tube 31 and smaller tubes 42.

The bolt head 51 engages the under surface of the flange 47. Turning the bolt 49 by means of a screw driver inserted in a slot 51 in the bolt head 51a clamps the shaft 13, plug 45, and tube 31 together in a rigid assembly. They are then both vertically and rotatively immovable relatively to each other. A pin 52 set in the shaft 13 is seated vertically in a slot 53 in the upper end portion of the wall of the tube 31, and a similar pin 54 set in the plug 45 is seated in a bayonet shaped slot (not shown) formed in the lower end portion of the tube 31. The beater assembly is thus freely rotatable at a fixed level with respect to the frame.

A longitudinal slot 70 in the side of the plug 45 and a wider end portion 71 of the slot 70 provide for the assembly of the plug 45, bolt 49 and shaft 13. The bolt is inserted laterally through these slots, the wider end portion 71 accommodating the bolt head 51. The assembled bolt and plug are then moved over the end of the shaft 13, and the bolt shank is threaded into the threaded bore 44 by means of a screwdriver, of which the blade is inserted through an opening 73 in the end plate 72 of the plug.

The radial wings 56, 57, extend arcuately and concentrically from the end plate 72 with respect to the axis of the beater assembly, and are curved slightly downwardly toward their ends. The wings are so shaped to facilitate the extrusion of the frozen material into receptacle 25 as the material moves down inside the chamber 14 of the machine.

A funnel 58 may be mounted on the frame 11, whereby the liquid material to be frozen is fed into the delivery pipe 59 and thence into the upper end of the freezing chamber 14. A spreader plate 60 may be suitably mounted on the upper end portion of the shaft 13, within the chamber 14 and just above the upper ends of the tubes 31 and 42, to receive the material from the pipe 59 and whirl it against the inner sides of the chamber 14 for even distribution thereon.

If the beater assembly 30 is rotating in a clockwise direction, it will appear as a counter clockwise direction in FIGURE 2, and is so indicated by the arrow 2. The weight of the large end 33 of the finger 32 brings a centrifugal pressure to bear upon the blade 36. The blade 36 has an outer rim surface 80 and advancing surface 81, a trailing surface 82 and a top surface 83. The surface 80 and 81 meet to form a sharp cutting edge 84. In operation with the blade at its extreme outermost position, the edge 84 is very, very slightly spaced inwardly from the bore surface of the jacket inner wall 18a.

As the layer of frozen product builds up on this inner surface of 18a it is scraped free by cutting edge 84, whipped back against 18a until a thick layer of material accumulates and is worked downwardly by the blades and extruded into the receptacle 25 by the wings 56 and 57 of the plug 45 which are shaped for this purpose. The plug 25 acts as an extruder, forcing the frozen product into the receptacle 25 and may be termed an extruder.

The rotatable beater 30 differs in many structural details from the beaters shown in my Patents 2,304,579 and 2,671,646. In addition to other and relatively minor details of construction and assembly, in the present beater the following relatively major differences are noted. The fingers in the present structure are each hinged midway of its ends at a point which is offset a substantial distance radially from the central rotational axis of the beater. The blade arm is medially located on the finger and is shaped to cut and shave the edible product as it congeals on the inner surface of the hollow cylinder, the cutting edge being directed forwardly toward the body of the coating of material on the inner surface of the cylinder. This finger between the end beyond the blade arm and the cutting edge is shaped to have a substantial weight which increases the centrifugal force applied to the cutting and beating end of the finger.

The other end of the finger is of a length, and is shaped to limit its radially inward movement and consequently the radially outward movement of the cutting and beating blade 36 to a point where it just does not have scraping contact with the inner surface of 18a. This limiting action results from the contact of the relatively long concavely arcuate surface 85 with the outer surface of the tube 31 of conforming curvature.

The reverse pivotal movement of each finger about its pivot pin 38 when the beater assembly slows down from its rotative movement is limited by contact of point 86 on the end 34 of the finger with the trailing side surface of the pin holding tube 42.

It will be noted that the swinging movement of a finger is over a very limited arc. It is also to be noted that the movement of the finger is definite, positive and assured due to the relatively great weight of the finger and the extended areas of contact of the stop points 85 and 86.

I claim:

1. In a device for freezing liquid material which includes a vertically extending cylinder having a smooth inner surface, means for introducing liquid material into the cylinder adjacent the upper end thereof, and means for cooling the cylinder along its inner surface below the freezing point of the liquid material; the improved beater assembly comprising: an axially extending supporting member rotatably mounted within the cylinder; and a plurality of finger members spaced about and pivotally mounted on the supporting member for movement between an operative position and an inoperative position, each of said finger members including a flat plate-like body portion of arcuate configuration with opposed upper and lower faces and having a concave inner edge facing the supporting member and a convex outer edge, and a blade portion with a forward cutting edge and a trailing edge projecting from one of said faces.

2. In a device for freezing liquid material which includes a vertically extending cylinder having a smooth inner surface, means for introducing liquid material into the cylinder adjacent the upper end thereof, and means for cooling the cylinder along its inner surface below the freezing point of the liquid material; the improved beater assembly comprising: an axially extending supporting member rotatably mounted within the cylinder; and a plurality of finger members spaced about and pivotally mounted on the supporting member for movement between an operative position and an inoperative position, each of said finger members including a flat plate-like body portion of arcuate configuration with opposed upper and lower faces and having a concave inner edge facing the supporting member and a convex outer edge, and a blade portion with a forward cutting edge and a trailing edge projecting from one of said faces in a plane substantially normal to the plane of the body portion.

3. In a device for freezing liquid material which includes a vertically extending cylinder having a smooth inner surface, means for introducing liquid material into the cylinder adjacent the upper end thereof, and means for cooling the cylinder along its inner surface below the freezing point of the liquid material; the improved beater assembly comprising: an axially extending supporting member rotatably mounted within the cylinder; and a plurality of finger members spaced about and pivotally mounted on the supporting member for movement between an operative position and an inoperative position, each of said finger members including a flat plate-like body portion of arcuate configuration with opposed upper and lower faces and having a concave inner edge facing the supporting member and a convex outer edge, and a blade portion with a forward cutting edge and a trailing edge depending from the lower face of the body portion adjacent the outer edge thereof in a plane substantially normal to the plane of the body portion.

4. In a device for freezing liquid material which includes a vertically extending cylinder having a smooth inner surface, means for introducing liquid material into the cylinder adjacent the upper end thereof, and means for cooling the cylinder along its inner surface below the freezing point of the liquid material; the improved beater assembly comprising: an axially extending supporting member rotatably mounted within the cylinder; and a plurality of finger members spaced about and pivotally mounted on the supporting member for movement between an operative position and an inoperative position, each of said finger members including a flat plate-like body portion of arcuate configuration with opposed upper and lower faces and having a concave inner edge facing the supporting member and a convex outer edge, and a blade portion with a forward cutting edge and a trailing edge projecting from the body portion adjacent the outer edge thereof, the position of the blade portion relative to the body portion being such that when the finger is in the operative position the cutting edge is immediately adjacent the inner surface of the cylinder and the trailing edge is spaced therefrom.

5. In a device for freezing liquid material which includes a vertically extending cylinder having a smooth inner surface, means for introducing liquid material into the cylinder adjacent the upper end thereof, and means for cooling the cylinder along its inner surface below the freezing point of the liquid material; the improved beater assembly comprising: an axially extending supporting member rotatably mounted within the cylinder; and a plurality of finger members spaced about and pivotally mounted on the supporting member for movement between an operative position and an inoperative position, each of said finger members including a flat plate-like body portion of arcuate configuration with opposed upper and lower faces and having a concave inner edge facing the supporting member and a convex outer edge, an arm portion extending from the outer edge of the body portion, and a blade portion with a cutting edge projecting from the arm portion substantially normal thereto.

6. In a device for freezing liquid material which includes a vertically extending cylinder having a smooth inner surface, means for introducing liquid material into the cylinder adjacent the upper end thereof, and means for cooling the cylinder along its inner surface below the freezing point of the liquid material; the improved beater assembly comprising: an axially extending supporting member rotatably mounted within the cylinder; and a plurality of finger members spaced about and pivotally mounted on the supporting member for movement between an operative position and an inoperative position, each of said finger members including a flat plate-like body portion of arcuate configuration with opposed upper and lower faces and having a concave inner edge facing the supporting member and a convex outer edge, an arm portion extending from the outer edge of the body portion, and a blade portion with a forward cutting edge and a trailing edge depending from the arm portion outwardly of the outer edge, the position of the blade portion relative to the body portion being such that when the finger is in the operative position the cutting edge is immediately adjacent the inner surface of the cylinder and the trailing edge is spaced further therefrom.

7. In a device for freezing liquid material which includes a vertically extending cylinder having a smooth inner surface, means for introducing liquid material into the cylinder adjacent the upper end thereof, and means for cooling the cylinder along its inner surface below the freezing point of the liquid material; the improved beater assembly comprising: an axially extending supporting member mounted within the cylinder for rotation in a scraping direction; and a plurality of finger members spaced about and pivotally mounted on the supporting member for movement between an operative position and an inoperative position, each of said finger members including an elongated body portion having opposed ends, pivotal mounting means adjacent one end of the body portion, and blade means projecting from said body portion between said pivotal mounting means and the other end thereof; each finger member being mounted on the supporting member so that the blade means is in a trailing position relative to the pivotal mounting means when the supporting member is rotated in the scraping direction.

8. In a device for freezing liquid material which includes a vertically extending cylinder having a smooth inner surface, means for introducing liquid material into the cylinder adjacent the upper end thereof, and means for cooling the cylinder along its inner surface below the freezing point of the liquid material; the improved beater assembly comprising: an axially extending supporting member mounted within the cylinder for rotation in a scraping direction; and a plurality of finger members spaced about and pivotally mounted on the supporting member for movement beween an operative position and an inoperative position, each of said finger members including an elongated body portion having opposed ends, pivotal mounting means adjacent one end of the body portion, and a blade portion with a forward cutting edge and a trailing edge depending from said body portion between said pivotal mounting means and the other end thereof; each finger member being mounted on the supporting member so that the blade portion is in a rearward position relative to the pivotal mounting means when the supporting member is rotated in the scraping direction.

9. The beater assembly set forth in claim 8 in which the cutting edge of the blade portion extends downwardly and rearwardly relative to the body portion.

10. The beater assembly set forth in claim 7 in which each finger member is provided with auxiliary weight-increasing means on the body portion thereof between the pivotal mounting means and said other end of the body portion.

11. In a device for freezing liquid material which includes a vertically extending cylinder having a smooth inner surface, means for introducing liquid material into the cylinder adjacent the upper end thereof, and means for cooling the cylinder along its inner surface below the freezing point of the liquid material; the improved beater assembly comprising: an axially extending cylindrical supporting member having an outer surface mounted within the cylinder for rotation in a scraping direction; a plurality of sets of longitudinally extending tubular members spaced circumferentially about the supporting member on the outer surface thereof, the tubular members in each set being spaced apart a predetermined distance; an elongated removable drive pin extending through the tubular members in each set in frictional holding engagement therewith; and a plurality of finger members pivotally mounted on each pin in the space between adjacent tubular members, each of said fingers including an elongated body portion having opposed ends, pivotal mounting means adjacent one end of the body portion, and blade means projecting from said body portion between said pivotal mounting means and the other end thereof; each finger member being mounted so that the blade means is in a trailing position relative to the pivotal mounting means when the supporting member is rotated in the scraping direction.

12. In a device for freezing liquid material which includes a vertically extending cylinder having a smooth inner surface, means for introducing liquid material into the cylinder adjacent the upper end thereof, and means for cooling the cylinder along its inner surface below the freezing point of the liquid material; the improved beater assembly comprising: an axially extending supporting member rotatably mounted within the cylinder; a plurality of circumferentially spaced, axially aligned finger supporting means on said supporting member; a plurality of finger members pivotally mounted on said supporting means for movement between an operative position and an inoperative position, each of said finger members containing a flat plate-like body portion of arcuate configuration including a convex outer edge and having pivotal mounting means adjacent one end thereof, the length of the body portion being greater than the circumferential spacing of the supporting means whereby the finger members are in a staggered overlapped relationship, the end of the body portion opposite to the mounting means being enlarged in size to increase the weight at said end; and blade means on said body portion adjacent the outer edge thereof between said mounting means and the enlarged end.

13. In a device for freezing liquid material which includes a vertically extending cylinder having a smooth inner surface, means for introducing liquid material into the cylinder adjacent the upper end thereof, and means for cooling the cylinder along its inner surface below the freezing point of the liquid material; the improved beater assembly comprising: an axially extending supporting member rotatably mounted within the cylinder; a plurality of circumferentially spaced, axially aligned finger supporting means on said supporting member; a plurality of finger members pivotally mounted on said supporting means for movement between an operative position and an inoperative position, each of said finger members containing a flat plate-like body portion of arcuate configuration including a convex outer edge and having pivotal mounting means adjacent one end thereof, the length of the body portion being greater than the circumferential spacing of the supporting means and the plane of the body portions being normal to the axis of the supporting member whereby the finger members are positioned in a staggered overlapping relationship; and blade means on said body portion adjacent the outer edge thereof and intermediate the pivotal mounting means and the other end of the body portion.

References Cited in the file of this patent

UNITED STATES PATENTS

| | | |
|---|---|---|
| 935,490 | Gerner | Sept. 28, 1909 |
| 2,272,715 | Lindsey | Feb. 10, 1942 |
| 2,304,579 | Lindsey | Dec. 8, 1942 |
| 2,622,411 | Ogden | Dec. 23, 1952 |
| 2,646,974 | Read | July 28, 1953 |
| 2,671,646 | Lindsey | Mar. 9, 1954 |
| 2,713,474 | Read | July 19, 1955 |